Combs & Leasure,

Pot for Smelting Glass.

No. 102,502.            Patented May 3, 1870.

Witnesses
J. Boone McLure,
J. W. Ward.

D. W. Combs
Henry J. Leasure

United States Patent Office.

ROY COMBS AND HENRY J. LEASURE, OF WHEELING, WEST VIRGINIA.

Letters Patent No. 102,502, dated May 3, 1870.

IMPROVEMENT IN POTS FOR SMELTING GLASS.

The Schedule referred to in these Letters Patent and making part of the same.

Be it known that we, ROY COMBS and HENRY J. LEASURE, of the city of Wheeling, county of Ohio, and State of West Virginia, have invented certain Improvements in the construction of Pots for Smelting Glass, of which the following is a specification.

Our invention relates to a pot for smelting glass in, constructed from two or more pieces, so that the crown of the pot and the base of the pot will be separated by one or more joints, when connected together to form the complete pot.

To enable others skilled in the art to make and use our invention, we will proceed to describe its construction and operation; and first, a pot made from two separate pieces, as represented in the annexed drawings.

Figure 1:
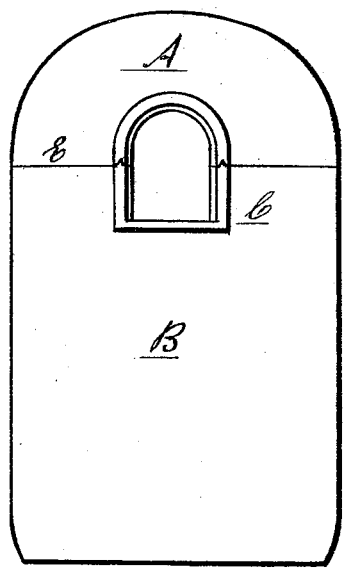

In Figure 1, of which A is the crown of the pot, formed in one piece, and

B, the base of the pot, also formed in one piece, both pieces being so made that, when placed together, they form a complete pot, the line of their connection, E, being about the center of the hood C, or above the metal line.

The hood C may be made in one piece, and connecting the crown A and base B together at that part, or partly on one or partly on both the crown and base, as shown by line E, fig. 1.

Figure 2:
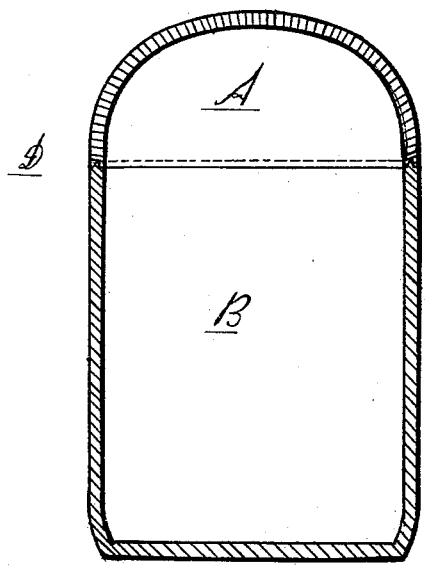

Figure 2 represents a longitudinal view of the one-half of a pot, separated in the center of the line of its length from top to bottom of the pot.

A represents the crown of the pot, and may be formed at its lower edge, D, in shape like a groove, tongue, dovetail, inclined plane, or in any other manner, so as to fit into or on a corresponding or suitable shape formed in, or on the top of the base of the pot B, so, when placed or brought together, they will make an entire pot, as represented in fig. 1.

The line of separation, E, may be had at any other suitable part of the pot, and we do not confine ourselves to the one described, but we think such a one to be the most advantageous.

When the pot is made of more than two pieces, the lines of separation and connection may be had at any desired parts, and formed so as to fit the several pieces together, as the one above described.

The object of our invention, or the forming the pot from two or more pieces, is to obviate a difficulty heretofore experienced by manufacturers of glass, viz, the cracking of the crown of the pot below the metal line, while being heated, or in use.

What we claim as new and our invention, which we desire to secure by Letters Patent, is—

A pot for smelting glass, constructed in two or more parts as herein described.

ROY COMBS.
HENRY J. LEASURE.

Witnesses:
J. BOONE McLURE,
J. W. WAND.